Patented Dec. 23, 1947

2,433,123

UNITED STATES PATENT OFFICE 2,433,123

CHEMICAL COMPOUNDS

Wayne W. Hudson, Sheridan, Mich.

No Drawing. Application June 16, 1945,
Serial No. 599,953

5 Claims. (Cl. 99—8)

The present invention relates to chemical compounds and more particularly to a compound well adapted to prevent spontaneous combustion, moulding, mildewing, rotting and the spoilage of hay, grain, beans, corn, ground feed, fodder and the like, the use of which compound does not affect germination of grain, beans, corn, etc.

The compound comprises bicarbonate of soda ($NaHCO_3$), preferably finely ground and a smaller amount of calcium carbonate ($CaCO_3$), preferably of four hundred (400) mesh quality.

It has been found that a proportion of ninety per cent (90%) finely ground sodium bicarbonate ($NaHCO_3$) and ten per cent (10%) four hundred (400) mesh calcium carbonate ($CaCO_3$) provides an ideal compounded mixture of the two ingredients but proportions of seventy-five per cent (75%) finely ground sodium bicarbonate ($NaHCO_3$) and twenty-five per cent (25%) 400 mesh calcium carbonate ($CaCO_3$) gives satisfactory results.

The hay, grain, corn or other feed which it is desired to protect against spontaneous combustion, moulding, mildewing, rotting and spoilage is preferably air cured to remove the greater percentage of the moisture content therefrom, the compound being well adapted to serve its purpose if the mass to be treated contains a moisture content of as much as twenty per cent (20%) after air curing and is in storage.

The calcium carbonate of the compound performs two functions. First and primarily it maintains the finely divided sodium bicarbonate in a fine and evenly divided condition, preventing the sodium bicarbonate from solidifying and becoming as hard as stone through the action of moisture. Second, the calcium carbonate is a sweetening agent and improves the treated material after the compound is applied to the same. In the first action the calcium carbonate counteracts the avidity of the sodium bicarbonate for moisture present in the crop when stored and also the moisture resulting from the sweating of the crop in storage.

In use, the compounded mixture is sprinkled on the mass to be treated which material seeps therethrough. One pound of the compound to a ton of hay has been found to be sufficient while the other feeds and grain require a thorough mixture of the compound throughout the mass treated. The compound thus mixed with the mass thus treated is sweetened, preventing fermentation and souring and consequent moulding, mildewing, rotting and spoilage and cattle, horses, sheep, hogs and fowl are benefited thereby.

Although hay may be thoroughly cured in the field, spontaneous combustion frequently occurs but by using the compound in the manner above suggested, when the heat within the hay mow reaches a temperature of approximately one hundred sixty-five degrees F. (165° F.), carbon di-oxide gas is formed which being of greater specific gravity than oxygen, causes the expulsion of the oxygen thereby destroying the products of combustion.

It will thus be seen that the compound herein described is highly efficient and utilitarian in its intended use, may be readily and conveniently employed and is reasonably economical in manufacture.

I claim:

1. A compound for preventing spoilage of hay, grain, corn comprising a mixture of particles of sodium bicarbonate ($NaHCO_3$) and calcium carbonate ($CaCO_3$) adapted to be thoroughly mixed with material to be treated for liberating carbon dioxide gas when the compound is subjected to the action of moisture, the calcium carbonate preventing solidification of the compound prior to use and sweetening the treated material after use.

2. A compound for preventing spoilage of hay, grain, corn comprising a mixture of particles of sodium bicarbonate ($NaHCO_3$) and calcium carbonate ($CaCO_3$) adapted to be thoroughly mixed with feed to be treated and in the proportions of not less than seventy-five per cent (75%) sodium bicarbonate ($NaHCO_3$) to twenty-five per cent (25%) calcium carbonate ($CaCO_3$) for liberating carbon dioxide gas when the compound is subjected to the action of moisture, the calcium carbonate preventing solidification of the compound prior to use and sweetening the treated material after use.

3. A compound for preventing spoilage of hay, grain, corn comprising a mixture of particles of sodium bicarbonate ($NaHCO_3$) and calcium carbonate ($CaCO_3$) adapted to be thoroughly mixed with feed to be treated and in the proportions of ninety per cent (90%) sodium bicarbonate ($NaHCO_3$) to ten per cent (10%) calcium carbonate ($CaCO_3$) for liberating carbon dioxide gas when the compound is subjected to the action of moisture, the calcium carbonate preventing solidification of the compound prior to use and sweetening the treated material after use.

4. A compound for preventing spoilage of hay, grain, corn comprising a mixture of particles of sodium bicarbonate (NaHCO$_3$) and calcium carbonate (CaCO$_3$) in the proportions of ninety per cent (90%) finely ground sodium bicarbonate (NaHCO$_3$) to ten per cent (10%) four hundred (400) mesh calcium carbonate (CaCO$_3$) for liberating carbon dioxide gas when the compound is subjected to the action of moisture, the calcium carbonate preventing solidification of the compound prior to use and sweetening the treated material after use.

5. The method of preventing spoilage of hay, grain, corn which comprises the act of thoroughly mixing a compound of finely divided particles of sodium bicarbonate (NaHCO$_3$) and calcium carbonate (CaCO$_3$) with the feed in the proportions of not less than seventy-five per cent (75%) sodium bicarbonate (NaHCO$_3$) to twenty-five per cent (25%) calcium carbonate (CaCO$_3$) for liberating carbon dioxide gas when the compound is subjected to the action of moisture, the calcium carbonate preventing solidification of the compound prior to use and sweetening the treated material after use.

WAYNE W. HUDSON.

REFERENCES CITED

The following references are of record in the file of this patent:

UNITED STATES PATENTS

| Number | Name | Date |
|---|---|---|
| 1,201,663 | Werner | Oct. 17, 1916 |
| 1,629,077 | Holken | May 17, 1927 |
| 2,274,905 | Lewis | Mar. 3, 1942 |

FOREIGN PATENTS

| Number | Country | Date |
|---|---|---|
| 29,543 | Great Britain | 1904 |